Dec. 18, 1956 J. W. RIEKE 2,774,873

BRIDGE STABILIZED OSCILLATOR

Filed Aug. 15, 1955 2 Sheets-Sheet 1

INVENTOR
J. W. RIEKE
BY W. L. Keefauver
ATTORNEY

Dec. 18, 1956 J. W. RIEKE 2,774,873

BRIDGE STABILIZED OSCILLATOR

Filed Aug. 15, 1955 2 Sheets-Sheet 2

INVENTOR
J. W. RIEKE
BY W. L. Keefauver
ATTORNEY

United States Patent Office 2,774,873

Patented Dec. 18, 1956

2,774,873

BRIDGE STABILIZED OSCILLATOR

John W. Rieke, Basking Ridge, N. J., assignor to Bell Telephone Laboratories, Incorporated, New York, N. Y., a corporation of New York Application August 15, 1955, Serial No. 528,369

7 Claims. (Cl. 250—36)

This invention relates to oscillator circuits and more particularly to bridge stabilized oscillators.

In certain carrier comunication systems, the carrier frequency energy is supplied by an oscillator in the transmitter terminal. The carrier frequency output wave of the transmitter oscillator is modulated by the various signal frequencies, and one of the resultant side bands of energy is transmitted over a suitable signal impulse transmitting medium to a receiver terminal. The transmission of a single side band permits the transmitting medium to have a narrower frequency response characteristic than would otherwise be required. In the receiver terminal, another carrier frequency oscillator is provided. The side band energy reaching the receiver terminal is combined with the output wave of the receiver oscillator and one of the products is the signal frequency energy that was modulated on the carrier at the transmitter terminal.

The receiver and transmitter terminal oscillators are usually crystal controlled for optimum frequency stability. Naturally it is essential that both oscillators generate energy at the same frequency so that the receiver terminal modulation products will have the same frequencies and phase relationships with one another as the signals modulated on the carrier at the transmitter terminal. As a practical matter, however, it is quite difficult to construct two oscillators which will always operate at the same frequency because of the crystal manufacturing tolerances.

For example, one carrier communication system uses a local oscillator frequency of the order of four megacycles, and present manufacturing methods can assure an accuracy of only plus or minus twenty cycles in preparing a crystal for a frequency in that range. A twenty cycle difference between transmitter and receiver oscillators causes intolerable low frequency modulation in carrier equipment that handles television signals. It is therefore desirable to have some means for making the transmitting and receiving oscillators operate at the same frequency.

A bridge stabilized oscillator of the type disclosed in the L. A. Meacham Patent No. 2,163,403 is a convenient source of stable uniform oscillations. As pointed in the Meacham patent, the frequency of the oscillator can be varied through a limited range by the adjustment of the variable reactance in the frequency sensitive arm of the bridge in the oscillator feedback path. Of course the adjustment could be accomplished either manually or automatically. However, any adjustment of the reactance in the bridge also brings about a change in the resistance of the reactance arm which unbalances the bridge. This is due to the undesirable characteristic resistance change in available variable reactors. The changed balance conditions of the bridge call for a new oscillator output level to maintain stable oscillation, and this changed oscillation level in the receiver terminal interferes with the intelligence conveyed by the demodulated signals.

The Meacham type of oscillator circuit employs a temperature responsive resistance for amplitude stabilization. Such a resistance has a long time constant compared to the period of the oscillator output wave which is necessary for a carrier wave for television signals. Because of the long time constant such resistance tends to hunt about a nominal value for stable oscillations with the result that the amount of feedback to the oscillator input changes in a similar fashion. This effect may be magnified because a change in the signal applied to an electron discharge device amplifier often causes a similar change in the amplification of the device. The net result of the two effects of the hunting may be to subject the oscillator output envelope to corresponding low frequency modulation. This is definitely objectionable in carrier terminals handling television signals as mentioned above.

It is therefore an object of this invention to improve the frequency and amplitude regulation of local oscillators in carrier system terminal equipment.

It is another object of this invention to improve the frequency correspondence between two oscillators which are required to generate oscillations of the same frequency.

A further object of the invention is to improve the envelope stability of bridge stabilized oscillators.

In accordance with one embodiment of the invention a bridge stabilized oscillator in a carrier system receiver terminal is provided with a saturable reactor in the frequency sensitive arm thereof for adjusting the receiver terminal oscillator frequency to correspond with the frequency of the transmitter terminal oscillator. A capacitive voltage divider connected between direct current ground and the screen grid of the oscillator amplification element has an intermediate point thereon connected to the bridge in the oscillator feedback path to sense, and compensate for, amplitude changes in the envelope of the oscillator output wave. A resistor of a predetermined critical value is connected in one arm of the bridge to make the current demanded by the feedback circuit independent of changes in the resistance of the reactive arm of the bridge.

Additional objects and advantages of the invention will be apparent from an examination of the following specification and the attached drawings in which:

Fig. 1*a* is a block diagram of a typical communication system;

Fig. 1*b* is a schematic circuit diagram of a bridge stabilized oscillator in accordance with the invention;

Figure 1B:
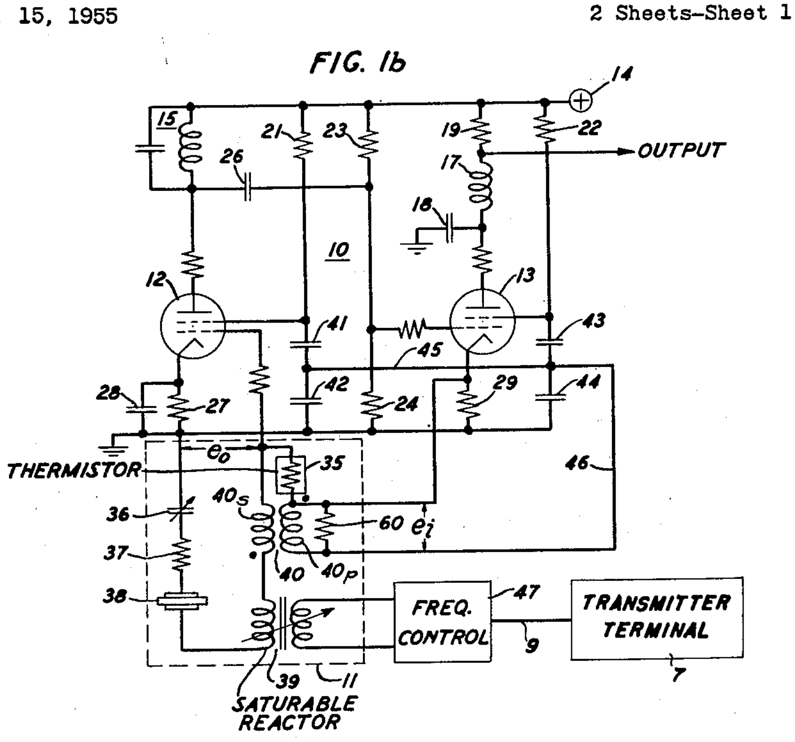
Figure 1A:
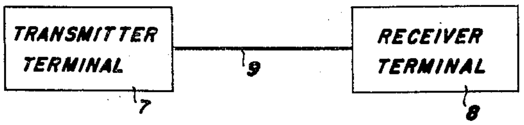

Referring to Fig. 1*a*, there is shown a typical carrier communication system comprising a transmitter terminal 7 and a receiver terminal 8 interconnected by a suitable transmission medium 9 which may, for example, consist of a coaxial transmission line. Each of terminals 7 and 8 includes a carrier oscillator of stabilized frequency similar to that shown in Fig. 1*b* and hereinafter described in connection therewith.

The bridge stabilized oscillator illustrated in Fig. 1*b* and located in receiver terminal 8 for the purpose of this description is interconnected with a similar oscillator in transmitter terminal 7 in a manner that will be described hereinafter. The oscillator includes an amplifier 10 and an impedance bridge 11 connected in the feedback loop of the amplifier. Amplifier 10 includes the vacuum tubes 12 and 13 which are supplied with power from the source 14. Each of the vacuum tubes must have at least an anode, a cathode, a control grid and a screen grid. The plate circuit of tube 12 includes the network 15, which is tuned to the desired oscillator frequency. A single frequency transformer, including the inductor 17 and the capacitor 18, is connected in the plate circuit of tube 13 to match the impedance of the plate circuit to the oscillator load. A load resistor 19 is also included in the plate circuit of the tube 13. Screen dropping resistors 21 and 22 connect the screen grids of tubes 12 and 13, respectively, to source 14. A voltage divider, including resistors 23 and 24, provides positive grid bias for tube 13. The output of tube 12 is coupled from the plate circuit thereof through a capacitor 26 to the grid of tube 13.

The resistors 27 and 29 cause the cathodes of tubes 12 and 13 to operate at a positive potential. A bypass capacitor 28 is connected in parallel with resistor 27. The unnumbered resistors in series with the various tube electrodes are anti-sing resistors.

Oscillator feedback potential is derived from the cathode circuit of tube 13 and is applied to the control grid of tube 12 through impedance bridge 11. The feedback circuit includes a negative feedback path through the arm of the bridge containing the thermistor 35 and a positive feedback path through the reactive arm of the bridge including capacitor 36, the resistor 37, the crystal 38 and the saturable reactor 39. Thermistor 35 regulates the oscillator output amplitude in accordance with the amount of current flowing in the negative feedback path. Oscillation frequency is controlled by the reactive arm of the bridge. The remaining two arms of the bridge embrace the primary and secondary windings $40_p$ and $40_s$, respectively, of transformer 40 which are poled as indicated in the drawing by the dots adjacent the respective windings.

A capacitive voltage divider including the capacitors 41 and 42, and having one terminal connected to direct current ground, has the other terminal connected to the screen grid of tube 12. Thus the screen grid is connected to alternating current ground. The capacitors 43 and 44 similarly connect the screen grid of tube 13 to alternating current ground. Intermediate points on the respective voltage dividers are connected together by lead 45. The same intermediate points are also connected via lead 46 to the terminal of primary winding $40_p$ which is remote from thermistor 35. This connection of the capacitive voltage dividers makes it possible to compensate for the effects of hunting of thermistor 35 as will be explained later. The two separate capacitors 42 and 44, rather than a single capacitor, were connected from lead 45 to ground to provide short, high frequency, bypass paths from each screen grid to ground.

Figure 2:
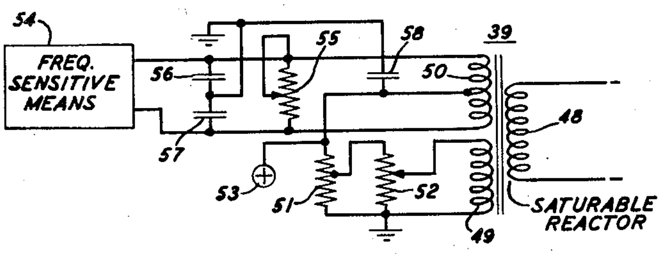
Fig. 2 is a schematic diagram illustrating one arrangement for the frequency control circuit of Fig. 1*b*.

Frequency controller 47 couples a direct current signal from the transmitter terminal 7 to the saturable reactor 39 to control the reactance thereof and thereby control the oscillator frequency in accordance with changes in the frequency of the oscillator in transmitter terminal 7. The details of an embodiment of frequency controller 47 are illustrated in the schematic diagram of Fig. 2 wherein reactor 39 includes a reactance winding 48, a bias winding 49 and a control winding 50. A voltage divider 51 and the potentiometer 52 connect bias winding 49 to the source 53. Adjustment of potentiometer 52 changes the nominal value of direct current bias on reactor 39. A suitable frequency sensitive means 54, such as that described in applicant's copending application Serial No. 332,449, filed January 21, 1953, supplies a direct current error signal to control winding 50. The amplitude and polarity of the error signal are functions of the difference between the frequency of the local oscillator in the receiver terminal 7 and the frequency of the local oscillator in the transmitting terminal 7. The range of control exercised is adjusted by a potentiometer 55 connected in shunt with control winding 50. Capacitors 56, 57 and 58 bypass carrier frequencies from bias winding 49 and control winding 50 to ground.

Reactor 39 with its associated frequency sensitive means 54 automatically causes the frequency of the reciver terminal oscillator to correspond with that of the transmitter oscillator. However, any change in the reactance of reactor 39 is accompanied by a change in the resistance thereof. Such a resistance change normally alters the balance condition of bridge 11 and thus the amount of energy which must be coupled from the oscillator output through the feedback path to the oscillator input to maintain the condition of sustained oscillations. In accordance with this invention, a resistor 60 is connected in parallel with primary winding $40_p$ to make the total oscillator output power essentially independent of such changes in bridge impedance.

The impedance assigned to resistor 60 is of such a magnitude that a change in the resistance of reactor 39, or other elements of the reactive branch of the bridge, does not affect the total cathode current of tube 13. Thus, although the balance condition of the bridge may be changed by a change in the resistance of reactor 39 there will be no resultant variation in the oscilator power output. The effective value of resistor 60 is dependent upon the general impedance level of the bridge and the temperature characteristic K of thermistor 35. Its value is also dependent upon the transformation ratio N of transformer 40 and, to a limited extent, on $\mu$, the ratio of bridge input voltage $e_i$ to bridge output voltage $e_o$ under the condition of attenuation in the feedback path which is equal to the gain in amplifier 10. In most cases $\mu$ is of a much higher order of magnitude than unity.

Figure 3:
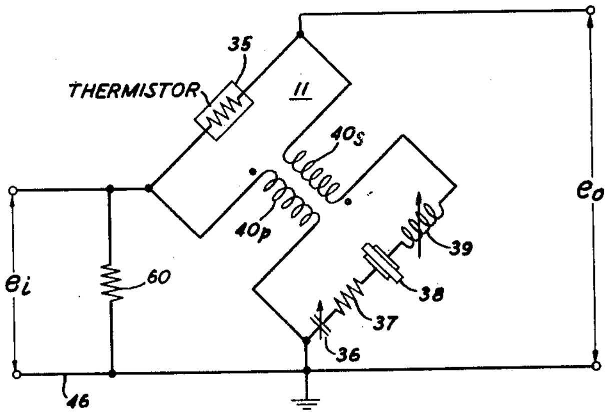
Figs. 3 through 5 are schematic equivalents of the impedance bridge of Fig. 1*b* which are used to illustrate the derivation of the formula for determining the critical value of the resistor 60.

An expression for the relation of resistor 60 to the above factors is obtained by an analysis of bridge circuit 11 wherein amplifier 10 is initially considered as a current source, as hereinafter indicated. Bridge 11 can be redrawn as shown in Fig. 3 to put it in a more conventional current source configuration. One terminal of primary winding $40_p$ is shown as being connected directly to ground. The circuit of Fig. 1*b* shows this terminal connected to ground through capacitors 42 and 44. This terminal is actually at alternating current ground, and since the analysis is concerned with only the alternating current performance of the bridge, capacitors 42 and 44 have been omitted from Figs. 3, 4 and 5. Thus, the bridge input terminals are the terminals of primary winding $40_p$. The bridge output terminals are the grounded terminal of primary winding $40_p$ and the common terminal of secondary winding $40_s$ and thermistor 35.

Figure 4:
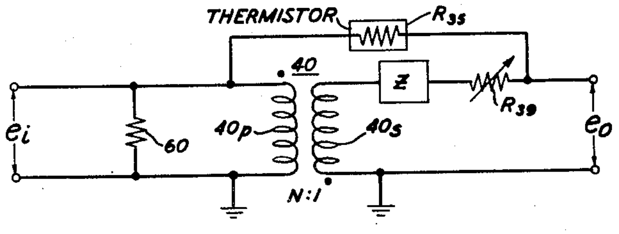

The circuit of Fig. 3 has been redrawn as shown in Fig. 4 in an equivalent arrangement to facilitate analysis. The reactive arm of bridge 11 is represented in Fig. 4 by an impedance Z and the variable resistance $R_{39}$, which is the adjustable resistance component of the reactive bridge impedances. The general resistance level of the rest of the bridge is represented by $R_{35}$, the resistance of thermistor 35 required for uniform sustained oscillations.

Figure 5:
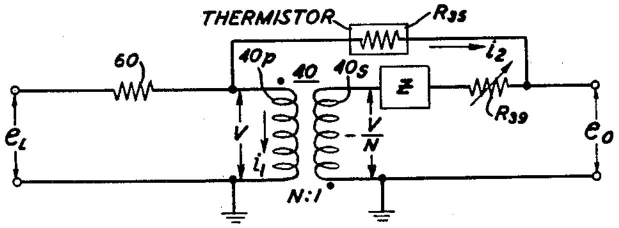

Fig. 5 is merely the Thevenin equivalent of the circuit of Fig. 4 with amplifier 10 now considered to be a voltage source and resistor 60 connected in series, rather than in parallel, with the primary winding of transformer 40. The current $i_1$ in Fig. 5 is the branch current flowing in the primary winding $40_p$, and $i_2$ is the branch current flowing in $R_{35}$. V is the induced voltage in the primary winding of transformer 40. Using a transformer turn ratio of N, the induced voltage in the secondary winding is $(-)\ V/N$.

Resistor 60 is designated $R_{60}$ for the sake of convenience in the equations presented hereinafter.

The loop equations for the loops including $e_i$, $e_o$, and transformer 40 are:

$$e_i = V + R_{60}(i_1 + i_2) \quad (1)$$

$$e_o = i_2 R_{39} - V/N \quad (2)$$

$$V=i_2R_{35}+i_2R_{39}-\frac{V}{N} \quad (3)$$

From Equation 3:

$$i_2=\frac{N+1}{N}\left(\frac{V}{R_{35}+R_{39}}\right) \quad (4)$$

Since $$i_1=\frac{i_2}{N}$$

then:

$$i_1+i_2=\left(\frac{N+1}{N}\right)^2\left(\frac{V}{R_{35}+R_{39}}\right) \quad (5)$$

Substituting the relation for the sum of $i_1$ and $i_2$ from Equation 5 in Equation 1:

$$e_1=V\left[1+\left(\frac{N+1}{N}\right)^2\left(\frac{R_{60}}{R_{35}+R_{39}}\right)\right] \quad (6)$$

It then follows from Equations 2, 4 and 6 that:

$$e_o=e_i\frac{R_{39}-\frac{R_{35}}{N}}{R_{39}+R_{35}+R_{60}\left(\frac{N+1}{N}\right)^2} \quad (7)$$

Solving for V in Equation 6 and substituting in Equation 4:

$$i_2=\left(\frac{N+1}{N}\right)\left[\frac{e_i}{R_{35}+R_{39}+R_{60}\left(\frac{N+1}{N}\right)^2}\right] \quad (8)$$

$$d\log i_2=d\log e_i-\frac{R_{35}}{R_{35}+R_{39}+R_{60}\left(\frac{N+1}{N}\right)^2}d\log R_{35}-\frac{R_{39}}{R_{35}+R_{39}+R_{60}\left(\frac{N+1}{N}\right)^2}d\log R_{39} \quad (9)$$

The thermistor characteristic is:

$$d\log R_{35}=-Kd\log i_2 \quad (10)$$

Substituting the value of $d$ log $i_2$ from Equation 10 in Equation 9:

$$\left[1-K\frac{R_{35}}{R_{35}+R_{39}+R_{60}\left(\frac{N+1}{N}\right)^2}\right]d\log R_{35}=\frac{KR_{39}}{R_{35}+R_{39}+R_{60}\left(\frac{N+1}{N}\right)^2}d\log R_{39}-Kd\log e_i \quad (11)$$

Solving for $d$ log $R_{35}$:

$$d\log R_{35}=\frac{\dfrac{KR_{39}}{R_{35}+R_{39}+R_{60}\left(\frac{N+1}{N}\right)^2}}{1-\dfrac{KR_{35}}{R_{35}+R_{39}+R_{60}\left(\frac{N+1}{N}\right)^2}}d\log R_{39}-\frac{K}{1-\dfrac{KR_{35}}{R_{35}+R_{39}+R_{60}\left(\frac{N+1}{N}\right)^2}}d\log e_1 \quad (12)$$

which is the thermistor characteristic in terms of oscillator output and the resistance $R_{39}$. Then from Equation 7:

$$d\log e_o=d\log e_i+\left[\frac{R_{39}}{R_{39}-\frac{R_{35}}{N}}-\frac{R_{39}}{R_{35}+R_{39}+R_{60}\left(\frac{N+1}{N}\right)^2}\right]d\log R_{39}-\left[\frac{1}{N}\frac{R_{35}}{R_{39}-\frac{R_{35}}{N}}+\frac{R_{35}}{R_{35}+R_{39}+R_{60}\left(\frac{N+1}{N}\right)^2}\right]d\log R_{35} \quad (13)$$

Eliminating $d$ log $R_{35}$ between Equations 12 and 13:

$$d\log e_o=\left\{1+\frac{K\left[\frac{R_{35}/N}{R_{39}-\frac{R_{35}}{N}}+\frac{R_{35}}{R_{35}+R_{39}+R_{60}\left(\frac{N+1}{N}\right)^2}\right]}{\left[1-K\frac{R_{35}}{R_{35}+R_{39}+R_{60}\left(\frac{N+1}{N}\right)^2}\right]}\right\}d\log e_i+\left\{\begin{array}{l}\left[\frac{R_{39}}{R_{39}-\frac{R_{35}}{N}}-\frac{R_{39}}{R_{35}+R_{39}+R_{60}\left(\frac{N+1}{N}\right)^2}\right]\\-\left[\frac{R_{35}/N}{R_{39}-\frac{R_{35}}{N}}+\frac{R_{35}}{R_{35}+R_{39}+R_{60}\left(\frac{N+1}{N}\right)^2}\right]\\x\left[\frac{KR_{39}}{R_{39}+R_{60}\left(\frac{N+1}{N}\right)^2-R_{35}(K-1)}\right]\end{array}\right\}[d\log R_{39}] \quad (14)$$

The connection of bridge output to input through the amplifier demands that $d$ log $e_o$=$d$ log $e_i$ if there is no amplifier compression. Since $\mu$ has been defined as the ratio $e_i$ to $e_o$, from Equation 7:

$$\mu=\frac{R_{35}+R_{39}+R_{60}\left(\frac{N+1}{N}\right)^2}{R_{39}-\frac{R_{35}}{N}} \quad (15)$$

Substituting $\mu$ in Equation 14:

$$\left[(\mu-1)R_{39}-\left(\frac{\mu}{N}+1\right)\frac{KR_{39}R_{35}}{R_{39}+R_{60}\left(\frac{N+1}{N}\right)^2-R_{35}(K-1)}\right]\frac{d\log e_i}{d\log R_{39}}=$$

$$\frac{x\left[R_{35}+R_{60}\left(\frac{N+1}{N}\right)^2-R_{35}(K-1)\right]}{K\left[\left(\frac{\mu+1}{N}\right)R_{35}\right]\left[R_{35}+R_{39}+R_{60}\left(\frac{N+1}{N}\right)^2\right]}=-\frac{KR_{35}R_{39}\left(\frac{\mu+1}{N}\right)-R_{39}(\mu-1)R_{39}+R_{60}\left(\frac{N+1}{N}\right)^2-R_{35}(K-1)}{\left[KR_{35}\left(\frac{\mu+1}{N}\right)\right]\left[R_{35}+R_{39}+R_{60}\left(\frac{N+1}{N}\right)^2\right]} \quad (16)$$

Since $$\frac{d \log e_i}{d \log R_{39}}$$

must equal zero that adjustment of reactor 339 will not disturb the resistive balance of bridge 11, $$KR_{35}R_{39}\left(\frac{\mu+1}{N}\right)=R_{39}(\mu-1)\left[R_{39}+R_{60}\left(\frac{N+1}{N}\right)^2-R_{35}(K-1)\right]$$

$$R_{60}=R_{35}\left[\left(\frac{K\mu}{\mu-1}\right)\left(\frac{N}{N+1}\right)-\left(\frac{N}{N+1}\right)^2\right]-\left(\frac{N}{N+1}\right)^2R_{39}. \quad (17)$$

Then because $\mu$ is always much greater than unity it is apparent from Equation 15 that $$R_{39}\doteq\frac{R_{35}}{N}$$

Substituting this relation in Equation 17:

$$R_{60}\doteq R_{35}\frac{N}{N+1}\left[\frac{K\mu}{\mu-1}-1\right]$$

$$R_{60}\doteq R_{35}\frac{N}{N+1}(K-1). \quad (18)$$

When $R_{60}$ is assigned the value shown in Equation 18 there will be no change in $e_i$ with changes in $R_{39}$. Because of the equivalency of the circuits of Figs. 4 and 5 the same value of $R_{60}$ connected in shunt makes the current requirements of bridge 11 independent of changes in $R_{39}$.

When power is first applied to the oscillator circuit of Fig. 1*b*, the resistance of thermistor 35 is very high, and there is very little negative feedback through thermistor 35 to the grid of tube 12. However, there is considerable positive feedback to the grid of tube 12 from the secondary winding of transformer 40. The large positive feedback voltage starts the circuit oscillating at a rate which is controlled by crystal 38 and at an amplitude which is limited only by the size of the vacuum tubes.

As thermistor 35 heats up, its resistance decreases and the negative feedback to the grid of tube 12 increases. This reduces the amplitude of the oscillations until the forward gain from the grid of tube 12 to the cathode of tube 13 is exactly equalized by the attenuation through bridge 11. When the attenuation in the feedback circuit becomes equal to the gain in amplifier 10, the oscillator generates uniform sustained oscillations. Any tendency to shift from this oscillatory condition is compensated by resistance changes in thermistor 35 which result in a restoration of the operating point.

If for some reason the plate current of tube 13 starts to increase, the increase in the portion of this current in thermistor 35 causes the thermistor resistance to start to decrease thus increasing the amount of negative feedback to tube 12. The realization of any significant increase in negative feedback, however, requires a relatively long time compared to the period of the oscillator output wave so thermistor 35 tends to hunt. As soon as the average plate current of tube 13 increases, the direct current potential of the cathode increases and this increase is passed via winding $40_p$ to lead 46 and the screen grid circuits where it causes a decrease in amplifier gain which smothers the hunting tendency of thermistor 35. A similar result takes place to produce an increase in gain upon the occurrence of a decrease in the average plate current in tube 13. Plate current variations at the oscillator output frequency are grounded via capacitors 42 and 44 and therefore do not cause any change in screen grid potential. Transformer 40 functions as an alternating current circuit element in the oscillator so its operation is not affected by the connection of one terminal thereof to the cathode of tube 13 which is above direct current ground. Thus a direct current gain control potential, which tends to cancel the low frequency gain changes caused by the hunting of thermistor 35, is obtained without the additional expense of rectifying a part of the oscillator output wave.

Since thermistor 35 controls the current in transformer 40, it also excises control of the cathode current of tube 13. This makes the output of tube 13 very nearly independent of its gain so that considerable aging of tube 13 can take place with little or no change in its output.

It is evident that, although this invention has been described in a particular illustrative embodiment, many other arrangements will be apparent to those skilled in the art and are included within the scope of the folowing claims.

What is claimed is:

1. In a carrier communication system having a receiver terminal and a transmitter terminal at the respective ends of each section of a transmission medium, separate bridge stabilized oscillators for generating carrier frequency energy at the receiver terminal and at the transmitter terminal, respectively, each of said oscillators comprising an amplifying device including at least one electron discharge device having a cathode and a screen grid, a feedback circuit connecting the output of said amplifying device to the input thereof, an impedance bridge connected in said feedback path, a temperature sensitive resistance, a separate capacitive voltage divider connected between the screen grid of each of said discharge devices and direct current ground, means connecting a point on said bridge above direct current ground to an intermediate point on each of said voltage dividers, a saturable reactor connected in one arm of said receiver terminal oscillator bridge circuit, frequency sensitive means including said saturable reactor for adjusting the frequency of said receiver terminal oscillator to correspond with the frequency of the said transmitter terminal oscillator, a resistor, and oscillator power output stabilizing means including said resistor and connected in said receiver terminal oscillator feedback loop between the output of said amplifier and the input of said bridge.

2. In a bridge stabilized oscillator for generating sustained oscillations and amplifier having an input and an output circuit, an impedance bridge, a feedback circuit including said bridge and having both a positive and a negative feedback path, connecting said output circuit to said input circuit, said bridge comprising a thermistor in one arm of said bridge in said negative feedback path, a transformer having its primary and secondary windings connected in a second and a third arm, respectively, of said bridge and in said positive feedback path, resonant reactance means connected in said positive feedback path and in the fourth arm of said bridge, a resistor, the value of said resistor being approximately equal to $$\frac{RN}{1+N}(K-1)$$

where

R=thermistor resistance required for uniform sustained oscillations,
K=thermistor temperature coefficient,
N=transformer turns ratio, and means connecting said resistor between said bridge input terminals whereby the feedback current drawn by said bridge is made independent of changes in the resistance of said reactance means.

3. In a stabilized oscillator having a feedback circuit including a positive and a negative feedback path coupling the output circuit thereof to the input circuit thereof and including an impedance bridge having input and output terminals, means connecting said bridge input terminals to said output circuit, and means connecting said bridge output terminals to said input circuit, the improvement in said oscillator comprising a saturable reactor for adjusting the frequency of said oscillator and having a reactance winding and a control winding, means connecting said reactance winding in one arm of said bridge in said positive feedback path, a thermistor connected in another arm of said bridge in said negative feedback path to regulate the amplitude of oscillations, a source of frequency control voltage, means applying the output of said source to said control winding to adjust the frequency of said oscillator in response to variations in the output of said source, a resistor connected between said bridge input terminals, and means including said resistor for rendering the input current required to bring the bridge to balance independent of resistance changes in said reactor.

4. In a bridge stabilized oscillator at least one electron discharge device as the gain producing element in the main signal path, said device including a cathode electrode and a screen grid electrode, an impedance bridge having the input thereof connected between said cathode and ground, a temperature responsive resistance element in one arm of said bridge, a positive feedback path for said oscillator and including said resistance, a capacitive voltage divider connected between said screen grid electrode and ground, means including said voltage divider for changing the gain of said gain producing element, and means connecting said gain correcting means to said bridge.

5. An oscillator comprising one or more electron discharge devices, at least one of said devices having a cathode and a screen grid, a current regenerating resistor connected between said cathode and direct current ground, an impedance bridge having a pair of input terminals, a temperature responsive resistance element in one arm of said bridge and having a long time constant compared to the oscillation period, said oscillator having a signal feedback path including said resistance, two capacitors connected in series between said screen grid and direct current ground, means connecting one of said bridge input terminals to said cathode and the other to the common terminal between said capacitors whereby the gain of said discharge device is regulated inversely in response to hunting of said temperature responsive resistance.

6. In a four-arm impedance bridge a variable resistance connected in a first arm of said bridge, a transformer having a primary winding in a second arm of said bridge and a secondary winding in a third arm of said bridge, resonant impedance means in the fourth arm of said bridge, the improvement in said bridge comprising a resistor connected across the input terminals thereof, the resistance of said resistor being equal approximately to $$\frac{RN}{1+N}(K-1)$$

where

R=thermistor resistance required for any given balance condition,

K=thermistor temperature coefficient,

N=transformer turns ratio, whereby the current drawn by said bridge is independent of changes in the resistance of said resonant impedance means.

7. In an oscillator having at least one electron discharge device as the gain producing element in the main signal path, said device including a cathode, a control grid, and a screen grid, a temperature responsive resistance element, a positive feedback path including said resistance and connected between said cathode and said control grid, a capacitive voltage divider connected between said screen grid electrode and ground, and means including a part of said voltage divider connected between said feedback path and said screen grid for changing the gain of said discharge device to oppose gain changes caused by feedback signals.

No references cited.